3,225,056
CERTAIN SUBSTITUTED BENZISOTHIAZOLES
John J. Traverso and Calvert W. Whitehead, Indianapolis,
Ind., assignors to Eli Lilly and Company, Indianapolis,
Ind., a corporation of Indiana
No Drawing. Filed Nov. 18, 1964, Ser. No. 412,253
8 Claims. (Cl. 260—301)

This invention relates to novel substituted 1,2-benzisothiazole 1,1-dioxides and to methods for their preparation.

With the possible exception of saccharin, the 1,2-benzisothiazole 1,1-dioxides are not well known to the chemistry of medicinal products. The art teaches certain derivatives of 6-amino-1,2-benzisothiazole 1,1-dioxide as having antitubercular properties and fungicidal properties. Other 1,2-benzisothiazole 1,1-dioxides have been found to give symptomatic relief of certain types of neuralgic, rheumatoid, and arthritic disorders. Still other examples of this type of compound show antihistaminic activity. However, substituted 1,2-benzisothiazole 1,1-dioxides such as herein disclosed and possessing the new and unexpected utilities herein described have not previously been known. These novel compounds have highly useful and unexpected properties as hypotensive agents and diuretics.

A primary object of this invention is to provide novel 1,2-benzisothiazole 1,1-dioxides differing in structure from the well-known above-mentioned saccharin. Another object of this invention is to provide processes for the preparation of the novel compounds. These and other objects of this invention are more fully described hereinafter.

The novel 1,2-benzisothiazole 1,1-dioxides of this invention are represented by the following general formula:

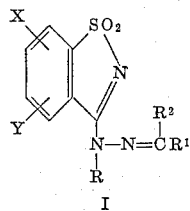

wherein X and Y can be hydrogen, a halogen such as chlorine, bromine, iodine, fluorine, or astatine, lower-alkyl, lower-alkoxy, or trifluoromethyl; R and $R^2$, when taken alone, are hydrogen; $R^1$, when taken alone, is $C_1$–$C_6$ alkyl or $C_2$–$C_7$ alkenyl; $R^1$ and $R^2$, when taken together with the carbon atom to which they are attached, form a cyclopentyl or cyclohexyl ring; and R and $R^1$, when taken together with the

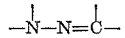

grouping to which they are attached, form a heterocyclic ring such as pyrazole, halopyrazole, lower-alkyl pyrazole, hydroxy pyrazoline, or lower-alkyl hydroxy pyrazoline. In this description, "lower-alkyl" is comprehended to encompass alkyl groups containing from one to four carbon atoms.

The following compounds are representative of the novel compounds of this invention:

3-[2-(2-butenylidene)hydrazino]-1,2-benzisothiazole 1,1-dioxide,
3-[2-(2-methyl-2-butenylidene)hydrazino]-1,2-benzisothiazole 1,1-dioxide,
3-[2-butylidenehydrazino]-1,2-benzisothiazole 1,1-dioxide,
6-chloro-3-[2-(2-methyl-2-butenylidene)hydrazino]-1,2-benzisothiazole 1,1-dioxide,
5,6-dimethoxy-3-[2-(2-butenylidene)hydrazino]-1,2-benzisothiazole 1,1-dioxide,
3-(4-bromo-3,5-dimethyl-1-pyrazolyl)-1,2-benzisothiazole 1,1-dioxide,
3-[2-cyclohexylidenehydrazino]-1,2-benzisothiazole 1,1-dioxide,
3-[2-(2-methyl-2-propylidene)hydrazino]-1,2-benzisothiazole 1,1-dioxide,
3-(1-pyrazolyl)-1,2-benzisothiazole 1,1-dioxide,
3-(3,5,5-trimethyl-2-pyrazolin-1-yl)-1,2-benzisothiazole 1,1-dioxide,
3-(5-hydroxy-2-pyrazolin-1-yl)-1,2-benzisothiazole 1,1-dioxide,
6-chloro-3-(1-pyrazolyl)-1,2-benzisothiazole 1,1-dioxide,
5,6-dimethoxy-3-(1-pyrazolyl)-1,2-benzisothiazole 1,1-dioxide,
5-methoxy-3-(1-pyrazolyl)-1,2-benzisothiazole 1,1dioxide,
5-chloro-3-(1-pyrazolyl)-1,2-benzisothiazole 1,1-dioxide,
6-fluoro-3-(1-pyrazolyl)-1,2-benzisothiazole 1,1-dioxide,
5-trifluoromethyl-3-(1-pyrazolyl)-1,2-benzisothiazole 1,1-dioxide,
3-(4-chloro-1-pyrazolyl)-1,2-benzisothiazole 1,1-dioxide,
3-(3,4,5-trimethyl-1-pyrazolyl)-1,2-benzisothiazole 1,1-dioxide,
3-(3,5-dimethyl-1-pyrazolyl)-1,2-benzisothiazole 1,1-dioxide,
3-(3,5-diethyl-1-pyrazolyl)-1,2-benzisothiazole 1,1-dioxide, and the like.

From the above description and examples, it can be seen that the novel 1,2-benzisothiazole 1,1-dioxides of this invention are markedly different in structure from the prior-art compound saccharin. The compounds of this invention have either a substituted hydrazino moiety or, alternatively, a pyrazole, substituted pyrazole, or pyrazolinyl radical, attached at the 3-position of the benzisothiazole nucleus; there is additional unsaturation in the isothiazole ring; and various substituents may be found attached to the benzenoid portion of the molecule.

The structural differences above described result in a most unusual series of compounds, a series which exhibits significant hypotensive activity and interesting diuretic activity.

The novel compounds of this invention are conveniently prepared utilizing as one of the starting reagents a 3-substituted 1,2-benzisothiazole 1,1-dioxide represented by the following formula:

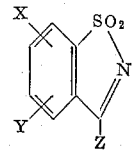

wherein X and Y have the same significance as hereinbefore, and Z is halogen or hydrazino. These starting benzisothiazoles are readily synthesized by methods well known to the art.

The 3 - (substituted - hydrazino)benzisothiazole compounds of this invention (Formula I, hereinabove) may be obtained by any one of several processes. One method comprises commingling a 3-hydrazino-1,2-benzisothiazole 1,1-dioxide or a substituted 3-hydrazino-1,2-benzisothiazole 1,1-dioxide with an appropriate carbonyl compound, suitably an aliphatic or cycloaliphatic aldehyde or ketone, in an inert organic mutual solvent such as dioxane, ethanol, propanol, Cellosolve, or the like, and heating the reaction mixture to a temperature in the range from about 40 to about 130° C., suitably around 60 to 100° C., preferably at the reflux temperature of the reaction mixture, for a period of time sufficient to produce a substantial yield of the desired condensation product. After cooling the reaction product mixture to room temperature, the solid material contained therein is conveniently filtered off. It is recrystallized from a suitable organic solvent such as methanol, ethanol, ethyl acetate, or, in some cases, water, to yield a 3-(substituted - hydrazino) - 1,2 - benzisothiazole 1,1 - dioxide. Compounds of the present invention which may be prepared according to this process include:

3-[2-(2-methyl-2-butenylidene)hydrazino]-1,2-benzisothiazole 1,1-dioxide;
6-chloro-3-[2-(2-methyl-2-butenylidene)hydrazino]-1,2-benzisothiazole 1,1-dioxide;
5,6-dimethoxy-3-[2-(methyl-2-butenylidene)hydrazino]-1,2-benzisothiazole 1,1-dioxide;
3-(2-butylidenehydrazino)-1,2-benzisothiazole 1,1-dioxide;
3-(2-cyclohexylidenehydrazino)-1,2-benzisothiazole 1,1-dioxide, and the like.

The heterocyclic-substituted benzisothiazoles of Formula I, supra, and described herein, can be conveniently prepared in several ways. One suitable method consists of heating a mixture of 3-chloro-1,2-benzisothiazole 1,1-dioxide and two equivalents of, for example, pyrazole, in the solid state, in the absence of a solvent. The second mole of pyrazole acts to take up hydrogen halide formed during the reaction and may be suitably replaced by a tertiary amine such as triethylamine, pyridine, tripropylamine, or the like. Higher temperatures may be employed when the reaction is thus carried out in the absence of a solvent, and sublimation of pyrazole during the reaction may readily be avoided by careful adjustment of the reaction mixture temperature. The reaction, which is exothermic, requires careful control. The reaction product mixture is conveniently worked up by washing it with water to remove the undesired by-product pyrazole salt, collecting the water-insoluble residue on a filter, and recrystallizing the residue from a suitable solvent such as ethyl acetate to yield the desired product (e.g., 3-(1-pyrazolyl)-1,2-benzisothiazole 1,1-dioxide from pyrazole).

The same type of condensation can be accomplished using an inert organic mutual solvent such as benzene, dioxane, toluene, and the like, for dissolving the halobenzisothiazole and the pyrazole reactants. In this case, when the reaction is complete, the reaction product mixture may be readily concentrated in vacuo to leave a residue, which is recrystallized from a suitable solvent such as ethyl acetate to yield the heterocyclic-substituted 1,2-benzisothiazole 1,1-dioxide.

Another method for preparing a pyrazole-substituted benzisothiazole comprises allowing a mixture of, for example, tetraethoxypropane, 3-hydrazino-1,2-benzisothiazole 1,1-dioxide, water, and a small amount of sulfuric acid to react at about ambient room temperature for a period of several hours. The reaction mixture first becomes homogeneous and then the intermediate product, 3 - (5 - hydroxypyrazolin - 1 - yl) - 1,2 - benzisothiazole 1,1-dioxide crystallizes out of the solution. The intermediate product is conveniently filtered off. It can be readily dehydrated by heating with a dehydrating agent such as acetic anhydride or trifluoroacetic acid, at steam-bath temperature. The reaction product mixture can be concentrated in vacuo to leave a residue which is recrystallized from a suitable solvent such as ethyl acetate to yield 3-(1-pyrazolyl)-1,2-benzisothiazole 1,1-dioxide.

In some cases a solvent other than water is conveniently used in the preparation described in the previous paragraph. For example, the reaction may be carried out by allowing a mixture of dipropionyl methane, 3-hydrazino-1,2-benzisothiazole 1,1-dioxide, and an inert organic mutual solvent such as Cellosolve to react at the reflux temperature of the mixture for several hours. The solvent is removed from the reaction product mixture in vacuo, and the residue remaining is recrystallized from ethyl acetate to yield the intermediate product, 3-(3,5-diethyl-5-hydroxypyrazolin-1-yl)-1,2-benzisothiazole 1,1-dioxide. This intermediate compound can be then conveniently dehydrated as described hereinabove, to yield 3 - (3,5 - diethyl-1 - pyrazolyl) - 1,2 - benzisothiazole 1,1-dioxide.

Other compounds of the present invention which may be prepared according to the above processes include 3-(1-pyrazolyl)-1,2-benzisothiazole 1,1-dioxide,
3-(3,5-dimethyl-1-pyrazolyl)-1,2-benzisothiazole 1,1-dioxide,
6-chloro-3-(1-pyrazolyl)-1,2-benzisothiazole 1,1-dioxide,
5,6-dimethoxy-3-(1-pyrazolyl)-1,2-benzisothiazole 1,1-dioxide, and the like.

While the above discussion of novel compounds mentions only pyrazole or substituted pyrazole radicals as substituents in the 3-position of the benzisothiazole nucleus, the invention is envisioned as including all compounds obtained by allowing the reaction of 3-chloro-1,2-benzisothiazone 1,1-dioxide with nitrogen containing heterocycles such as imidazoles, triazoles, oxadiazines, oxatriazines, thiadiazines, thiatriazines, azepines, diazepines, and the like, sufficiently basic in character to react therewith.

That the invention may be more easily comprehended, examples of the synthesis of compounds coming within the scope of the invention are given hereinbelow.

EXAMPLE 1

*3-[2-(2-methyl-2-butenylidene)hydrazino]-1,2-benzisothiazole 1,1-dioxide.*—A mixture of 19.7 g. (0.10 mole) of 3-hydrazino-1,2-benzisothiazole 1,1-dioxide and 12.6 g. (0.15 mole) of tiglaldehyde in 200 ml. of dioxane was refluxed for about two hours. The reaction product mixture was cooled to room temperature and the solid product was filtered off. Crystallization of the solid product from methanol yielded 3-[2-(2-methyl-2 - butenylidene)hydrazino]-1,2-benzisothiazole 1,1-dioxide having a melting point of about 250° C. (d.). Yield: 20.3 g. (77 percent of theory).

*Analysis.*—Calc'd: C, 54.73; H, 4.97; N, 15.96. Found: C, 54.80; H, 5.14; N, 16.06.

EXAMPLE 2

*6-chloro-3-[2-(2-methyl - 2 - butenylidene)hydrazino]-1,2-benzisothiazole 1,1-dioxide.*—Following the procedure of Example 1, but using 4 g. (0.017 mole) of 6-chloro-3-hydrazino-1,2-benzisothiazone 1,1-dioxide and 2 g. (0.024 mole of tiglaldehyde as reactants, 6-chloro-3-[2-(2-methyl-2-butenylidene) hydrazino-1,2-benzisothiazole 1,1-dioxide was obtained as a solid having a melting point of about 250° C. (d.) after recrystallization from methanol. Yield: 2.5 g. (71 percent of theory).

*Analysis.*—Calc'd: C, 48.40; H, 4.06; N, 14.11. Found: C, 48.43; H, 4.28; N, 13.99.

EXAMPLE 3

*5,6-dimethoxy-3-[2-(2-methyl - 2 - butenylidene)hydrazino]-1,2-benzisothiazole 1,1-dioxide.*—Following the procedure of Example 1, but using 1.36 g. (0.0053 mole) of 5,6-dimethoxy-3-hydrazino-1,2-benzisothiazole 1,1-dioxide and 1 g. (0.012 mole) of tiglaldehyde as reactants, 5,6-dimethoxy-3-[2-(2-methyl - 2 - butenylidene)hydrazino]-1,2-benzisothiazole 1,1-dioxide was obtained having a melting point of about 230° C. (d.) after recrystallization from methanol. Yield: 0.4 g. (23 percent of theory).

*Analysis.*—Calc'd: C, 52.00; H, 5.30; N, 13.00. Found: C, 51.89; H, 5.44; N, 12.74.

EXAMPLE 4

3-(2-butylidenehydrazino) - 1,2 - benzisothiazole 1,1-dioxide.—Following the procedure of Example 1, but using 19.7 g. (0.10 mole) of 3-hydrazino-1,2-benzisothiazole 1,1-dioxide and 10 g. (0.14 mole) of n-butyraldehyde as reactants, 3-(2-butylidenehydrazino)-1,2-benzisothiazole 1,1-dioxide was obtained as a crystalline product having a melting point of about 95° C. and found by analysis to contain one molecule of water of crystallization. Yield: 10 g. (40 percent of theory).

*Analysis.*—Calc'd: C, 49.05; H, 5.61; N, 15.60. Found: C, 50.10; H, 5.84; N, 15.24.

EXAMPLE 5

3-[2-(2-butenylidene)hydrazino] - 1,2 - benzisothiazole 1,1-dioxide.—Following the procedure of Example 1, but using 10 g. (0.05 mole) of 3-hydrazino-1,2-benzisothiazole 1,1-dioxide and 100 ml. (excess as solvent) of crotonaldehyde as reactants, 3-[2-(2-butenylidene)hydrazino]-1,2-benzisothiazole 1,1-dioxide was obtained as a solid having a melting point of about 186° C. after recrystallization from methanol. Yield: 9.5 g. (76 percent of theory).

*Analysis.*—Calc'd: C, 52.99; H, 4.44; N, 16.86. Found: C, 52.29; H, 4.75; N, 16.53.

EXAMPLE 6

3-[2-(2-methyl-2-propylidene)hydrazino]-1,2 - benzisothiazole 1,1-dioxide.—Following the procedure of Example 1, but using 25 g. (0.127 mole) of 3-hydrazino-1,2-benzisothiazole 1,1- dioxide and 25 g. (0.32 mole) of a 90 percent aqueous solution of α-methylacrylaldehyde as reactants, 3-[-(2-methyl-propylidene)-hydrazino]-1,2-benzisothiazole 1,1-dioxide was obtained as a solid having a melting point of about 211° C. after recrystallization from methanol. Yield: 20 g. (63.5 percent of theory).

*Analysis.*—Calc'd: C, 53.21; H, 4.05; N, 16.92. Found: C, 53.74; H, 4.72; N, 17.30.

EXAMPLE 7

3-(2-cyclohexylidenehydrazino)-1,2-benzisothiazole 1,1-dioxide.—Following the procedure of Example 1, but using 10 g. (0.05 mole) of 3-hydrazino-1,2-benzisothiazole 1,1-dioxide and 4.97 g. (0.05 mole) of cyclohexanone as reactants, 3-(2-cyclohexylidenehydrazino) - 1,2-benzisothiazole 1,1-dioxide was obtained as a solid having a melting point of about 178° C. after recrystallization from ethyl acetate. Yield: 2 g. (14.5 percent of theory).

*Analysis.*—Calc'd: C, 56.29; H, 5.45; N, 15.15. Found: C, 55.96; H, 5.88; N, 14.79.

EXAMPLE 8

3-(1-pyrazolyl)-1,2-benzisothiazole 1,1-dioxide.—Step A. To a rapidly stirred suspension composed of 20 g. (0.1 mole) of 3-hydrazino-1,2-benzisothiazole 1,1-dioxide, 250 ml. of water, and 30 g. (0.136 mole) of tetraethoxypropane were added rapidly dropwise 8 g. (0.076 mole) of concentrated sulfuric acid. The reaction mixture was stirred at room temperature for several hours, during which time the mixture became homogeneous, and a solid subsequently crystallized therefrom. The reaction product mixture was filtered and the solid thus collected, which weighed 22 g. (87 percent of theory) was recrystallized from ethyl acetate to yield 3-(5-hydroxypyrazolin-1-yl)-1,2-benzisothiazole 1,1-dioxide as a solid having a melting point of about 217° C.

*Analysis.*—Calc'd: C, 47.80; H, 3.61; N, 16.72. Found: C, 47.79; H, 3.86; N, 16.73.

Step B. A mixture of 96 g. (0.385 mole) of 3-(5-hydroxypyrazolin-1-yl)-1,2-benzisothiazole 1,1-dioxide and 700 ml. of acetic anhydride was heated on the steam bath for about 3 hours. The unreacted acetic anhydride was distilled from the reaction product mixture in vacuo and the residue was recrystallized from ethyl acetate to yield 3-(1-pyrazolyl)-1,2-benzisothiazole 1,1-dioxide as a solid having a melting point of about 220° C. Yield: 50.5 g. (54.5 percent of theory).

*Analysis.*—Calc'd: C, 51.49; H, 3.03; N. 18.02. Found: C, 51.72; H, 3.28; N, 17.60.

EXAMPLE 9

3-(3,5-diethyl-1-pyrazolyl)-1,2-benzisothiazole 1,1-dioxide.—A mixture composed of 20 g. (0.1 mole) of 3-hydrazino-1,2-benzisothiazole 1,1-dioxide, 20 g. (0.156 mole) of dipropionylmethane, and 150 ml. of Cellosolve was refluxed for several hours. The reaction product mixture was concentrated in vacuo to remove the solvent. The residue remaining was recrystallized from ethyl acetate to yield 3-(3,5-diethyl-5-hydroxypyrazolin-1-yl)-1,2-benzisothiazole 1,1-dioxide as a solid having a melting point of about 189° C. Yield: 23 g. (79.5 percent of theory).

*Analysis.*—Calc'd. C, 54.70; H, 5.57; N, 13.67; O, 15.62. Found: C, 54.79; H, 5.61; N, 14.01; O, 15.63.

Following the procedure of Example 8, Step B, the 3-(3,5-diethyl-5-hydroxypyrazolin-1-yl) - 1,2-benzisothiazole, 1,1-dioxide, 20 g. (0.08 mole), was reacted with acetic anhydride in dioxane and 3-(3,5-diethyl-1-pyrazolyl)-1,2-benzisothiazole 1,1-dioxane was obtained as a solid having a melting point of about 140° C. after recrystallization from ethyl acetate. Yield: 10 g. (42 percent of theory).

*Analysis.*—Calc'd: C, 58.11; H, 5.22; N, 14.52. Found: C, 57.98; H, 5.25; N, 14.26.

EXAMPLE 10

3-(3,5,5-trimethyl-2-pyrazolin-1-yl) - 1,2 - benzisothiazole 1,1-dioxide.—A mixture of 10 g. (0.05 mole) of 3-hydrazino-1,2-benzisothiazole 1,1-dioxide and 100 ml. of redistilled mesityl oxide was heated on the steam bath for several hours, during which time complete solution occurred. The reaction product mixture was concentrated under reduced pressure in order to remove unreacted mesityl oxide. The residue was recrystallized from ethyl acetate to yield 3-(3,5,5-trimethyl-2-pyrazolin-1-yl)-1,2-benzisothiazole 1,1-dioxide as a solid having a melting point of about 198° C. Yield: 5 g. (40 percent of theory).

*Analysis.*—Calc'd: C, 56.29; H, 5.45; N, 15.15. Found: C, 56.06; H, 5.52; N, 14.88.

EXAMPLE 11

3-(3,5-dimethyl-1-pyrazolyl)-1,2-benzisothiazole 1,1-dioxide.—Following the procedure of Example 10 but using 5 g. (0.025 mole) of 3-hydrazino-1,2-benzisothiazole 1,1-dioxide and 2,4-pentanedione, in large excess, as reactants, 3-(3,5-dimethyl-1-pyrazolyl)-1,2 - benzisothiazole 1,1-dioxide was obtained as a solid having a melting point of about 191° C. after recrystallization from ethanol. Yield: 4 g. (61.5 percent of theory).

*Analysis.*—Calc'd: C, 55.15; H, 4.24; N, 16.08. Found: C, 55.40; H, 4.48; N, 15.74.

EXAMPLE 12

3-(3,4,5-trimethyl-1-pyrazolyl-1,2-benzisothiazole 1,1-dioxide.—A mixture of 10 g. (0.05 mole) of 3-hydrazino-1,2-benzisothiazole 1,1-dioxide and 5.8 g. (0.05 mole) of 3-methyl-2,4-pentanedione in 80 ml. of dioxane was refluxed for about 18 hours. The reaction product mixture was concentrated in vacuo to remove the solvent, and the residue was recrystallized from ethyl acetate, to yield 3-(3,4,5-trimethyl-5-hydroxypyrazolin-1 - yl)-1,2-benzisothiazole 1,1-dioxide as a solid having a melting point of about 175–180° C. Yield: 4 g. (27.3 percent of theory).

*Analysis.*—Calc'd: C, 53.24; H, 5.16; N, 14.33. Found: C, 53.97; H, 5.13; N, 14.77.

A mixture of 2 g. (0.007 mole) of 3-(3,4,5-trimethyl-5-hydroxypyrazolin-1-yl)-1,2-benzisothiazole 1,1-dioxide and 75 ml. of acetic anhydride was heated for about 5 hours on the steam bath. The reaction product mixture was concentrated in vacuo and the residue thereby obtained was recrystallized from ethyl acetate to yield 3-(3,4-5-trimethyl-1-pyrazolyl)-1,2 - benzisothiazole 1,1-dioxide as a solid having a melting point of about 273° C. Yield: 1.1 g. (57 percent of theory).

*Analysis.*—Calc'd: C, 56.71; H, 4.75; N, 15.26. Found: C, 56.52; H, 4.73; N, 14.89.

EXAMPLE 13

*3-(4-chloro-1-pyrazolyl) - 1,2 - benzisothiazole 1,1-dioxide.*—A mixture of 10 g. (0.05 mole) of 3-chloro-1,2-benzisothiazole 1,1-dioxide and 11.2 (0.11 mole) of 4-chloropyrazole was fused in a flask in an oil bath and maintained at that temperature for about 2 hours. The reaction product mixture was cooled and washed with cold water, whereupon it solidified. The solid material was filtered off and the filtrate discarded. The solid was then recrystallized from dry benzene to yield 3-(4-chloro-1-pyrazolyl)-1,2-benzisothiazole 1,1-dioxide as a solid having a melting point of about 145° C. Yield: 4 g. (31 percent of theory).

*Analysis.*—Calc'd: C, 44.86; H, 2.25; N, 15.70. Found: C, 45.17; H, 2.48; N, 15.63.

EXAMPLE 14

*3-(4-bromo-3,5-dimethyl - 1 - pyrazolyl) - 1,2-benzisothiazole 1,1-dioxide.*—A solution of 26 g. (0.10 mole) of 3-(3,5-dimethyl-1-pyrazolyl)-1,2-benzisothiazole 1,1-dioxide in 300 ml. of chloroform was allowed to react with 16 g. (0.1 mole) of bromine for a period of about 12 hours at ambient room temperature. The reaction product mixture was concentrated by evaporating the solvent on the steam bath to leave a residue. The residue was recrystallized from ethyl acetate to yield 3-(4-bromo-3,5-dimethyl-1-pyrazolyl)-1,2-benzisothiazole 1,1-dioxide as a solid having a melting point of about 250° C. (d.). Yield: 26 g. (76.5 percent of theory).

*Analysis.*—Calc'd: C, 42.36; H, 2.96; N, 12.35. Found: C, 42.53; H, 3.25; N, 12.37.

We claim:
1. The compounds having the following formula

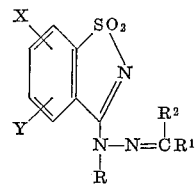

wherein R and $R^2$, when taken alone, are hydrogen; $R^1$, when taken alone, is selected from the group consisting of $C_1$–$C_6$ alkyl, and $C_2$–$C_7$ alkenyl; X and Y are selected from the group consisting of hydrogen, halogen, lower alkyl, trifluoromethyl, and lower alkyloxy; $R^1$ and $R^2$, when taken together with the carbon atom to which they are attached, form $C_5$–$C_6$ cycloalkyl; and R and $R^1$, when taken together with the

grouping to which they are attached, form a heterocyclic ring selected from the group consisting of pyrazole, halopyrazole, lower-alkyl pyrazole, hydroxypyrazoline, and lower-alkyl hydroxy pyrazoline.

2. 3-[2 - (2 - methyl - 2 - butenylidene)hydrazino]-1,2-benzisothiazole 1,1-dioxide.

3. 6-chloro - 3 - [2 - (2-methyl-2-butenylidene)hydrazino]-1,2-benzisothiazole 1,1-dioxide.

4. 5,6-dimethoxy-3-[2-(2-methyl - 2 - butenylidene)hydrazino]-1,2-benzisothiazole 1,1-dioxide.

5. 3-(1-pyrazolyl)-1,2-benzisothiazole 1,1-dioxide.

6. 3-(3,5-dimethyl-1-pyrazolyl) - 1,2 - benzisothiazole 1,1-dioxide.

7. 3-(3,5,5-trimethyl - 2 - pyrazoline-1-yl)-1,2-benzisothiazole 1,1-dioxide.

8. 3-(5-hydroxy-2-pyrazoline-1-yl) - 1,2-benzisothiazole 1,1-dioxide.

No references cited.

NICHOLAS S. RIZZO, *Primary Examiner.*